Figure 1:
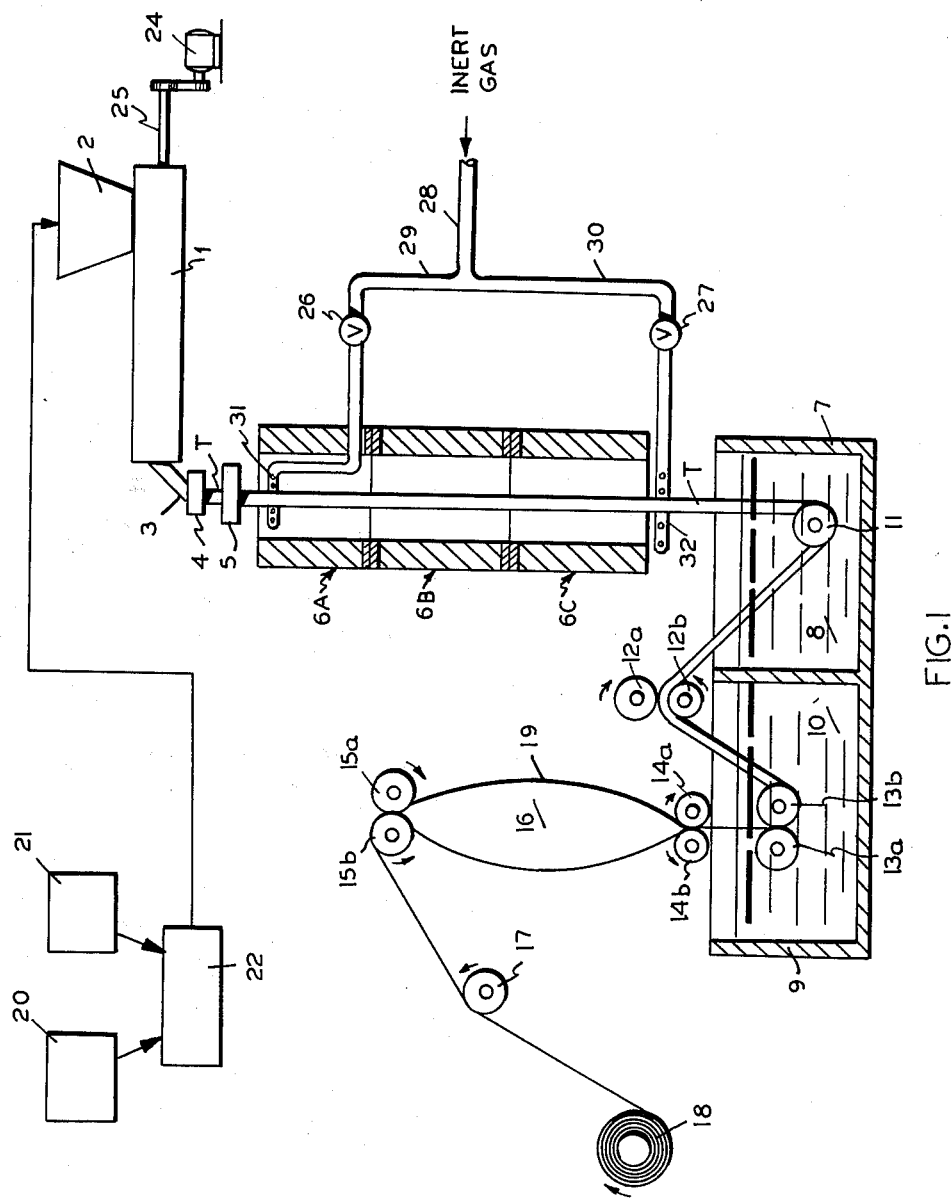

INVENTORS
CALVIN J. BENNING
RAZMIC S. GREGORIAN
FRANK X. WERBER
BY
*William W. McDowell Jr.*
ATTORNEY

3,201,503
PROCESS FOR FORMING CROSS-LINKED POLYETHYLENE FILM

Calvin J. Benning, Clarksville, Razmic S. Gregorian, Silver Spring, and Frank X. Werber, Rockville, Md., assignors to W. R. Grace & Co., New York, N.Y., a corporation of Connecticut
Filed Jan. 31, 1962, Ser. No. 170,214
21 Claims. (Cl. 264—95)

This invention is directed to a continuous process for making shrinkable polyethylene film.

In summary, the process comprises the following steps:

(1) Forming a substantially homogeneous mixture of a normally solid polyethylene with a cross-linking agent, preferably an organic peroxide;

(2) Shaping the mixture into a tube by extruding at temperatures sufficient to melt the polyethylene but below the gel point of the mixture;

(3) Feeding the tube as it leaves the extruder into a curing zone maintained at temperatures sufficient to heat the tube at least to the decomposition temperature of the crosslinking agent and preferably provided with an inert atmosphere;

(4) Passing the tube through said zone at a rate sufficient to decompose at least about 85% by weight of the crosslinking agent, whereby the tube is "cured," i.e., the polyethylene is crosslinked;

(5) Expanding the crosslinked polyethylene tube by the "trapped bubble" technique and recovering the film produced.

The resultant film can then be used for the standard uses of polyethylene film. Its high shrink energy, strength, and clarity make it especially suitable for shrink-fit packaging of numerous articles, e.g., foods. That is, it can be used to wrap hams, chickens, etc., followed by evacuation of the air between the film and the wrapped object, followed finally by heating the wrapped object to shrink the film closely against the object.

One embodiment of the invention is described in the following example.

EXAMPLE 1

The polyethylene used was a commercially available low density (0.92) branched type made by the well-known high pressure process. The peroxide used was 2,5-dimethyl-2,5-di(tert-butylperoxy)hexane of the formula:

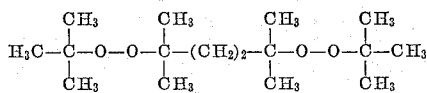

A solution of 30 grams of the peroxide in 200 cubic centimeters of petroleum ether was sprayed on pellets of the polyethylene in a twin-shell blender, so as to coat the pellets with about 0.75 weight percent peroxide.

The thus prepared homogeneous polyethylene-peroxide mixture was then charged to a tube extruder. The tube extruder can be of any conventional design for the extrusion of polyethylene tubing. In this particular apparatus the material was screw-fed through a 1″ diameter heated barrel, 20 inches long, to a die face for one inch diameter tubing, 20 mils wall thickness. The extruder was maintained at temperatures of 230° to 300° Fahrenheit (230° at the feed hopper to 300° at the die), and was operated so as to produce between 2½ and 6½ pounds of tubing per hour. Under these conditions premature crosslinking in the extruder barrel or die was held to a minimum (less than 2% gel formation).

The extruded tube was cured (crosslinked) by passing it upward through a furnace. The furnace interior can be several times the diameter of the tube, and 10 to 12 times as long. In this particular run the furnace interior was 3 inches inner diameter and 12 inches long. Heating was by electrical resistance wire. The temperature inside the furnace was about 500° Fahrenheit. Residence time in the furnace was about 40 seconds. The interior of the furnace was continually flushed with pre-heated nitrogen to minimize oxidative degradation. These conditions give a gel content of the cured tube of about 60%, as determined by extraction of a sample in boiling toluene.

The temperature of the furnace is important. The temperature should be sufficiently high to provide rapid crosslinking, and yet not so high as to scorch the tube. Rapid crosslinking is essential, as the tube does not become self-supporting until it is crosslinked. For instance, under the conditions described in this example, the tube was only about ⅓ crosslinked (20% gel) at a furnace temperature of 300° Fahrenheit and was very difficult to support on account of its low melt viscosity. Even at 350° Fahrenheit there was still a slight flow. At 400° Fahrenheit the tube became self-supporting, and approached maximum strength between 450 and 550° Fahrenheit. Above 550° there was evidence of scorching at normal furnace residence times.

The cured tube can be cooled and coiled up flat as tape, or it can be expanded immediately in the next operation while still near its melting point.

To expand the tube, the trapped bubble technique is used. This technique is well-known, and is described, for example, in Kirk-Othmer, Encyclopedia of Chemical Technology, vol. 14, pp. 751-752. As applied to the instant operation a 3 foot length of tube (at approximately the melting point of the polyethylene, i.e., 100° centigrade) is drawn up and pinched off between a first and a second set of rolls. This section contains nitrogen, air, or other inert gas under pressure. The gas can be added by syringe, and the syringe hole sealed with cellulose tape. As the tube is now advanced to the second set of rolls, the gas pressure expands the advancing tube section into a bubble, which remains the same shape as the tube advances continuously around it. Bubble expansion provides biaxial orientation of the resultant film. The ratio of bubble diameter to tube diameter can vary within wide limits, depending on the film thickness desired and the degree of stretching desired. A typical ratio is 5:1. Thus for a 1 inch diameter tube, the bubble diameter is generally about 5 inches and transverse stretching has a factor of five, so that (with no longitudinal stretching) a 20 mil tube is stretched to a film 20÷5 or 4 mils thick. If an equal amount of longitudinal stretching is desired, the take up rolls on the far side of the bubble are run five times faster than the tube extrusion rate, so that the ultimate biaxially oriented film has a thickness of 20÷5÷5, or 0.8 mil.

The tubular film so formed is either rolled up as made, or is cut at the edges and rolled up as flat film on two separate rolls.

Biaxially-oriented peroxide-crosslinked film prepared by the process of this invention is in general similar to oriented radiation-crosslinked film. However, in respect of certain properties important in the field of food packaging, it is superior, as shown by the following comparative data:

| Property | Radiation Crosslinked | Peroxide Crosslinked |
|---|---|---|
| Percent shrink at 205° Fahrenheit: | | |
| Longitudinal | 36-42 | 37-60 |
| Transverse | 49-58 | 51-78 |
| Percent Haze | 5-18 | 3-10 |
| Oxygen Permeability (cc./mil/atm./m.²/day) | 7,000-9,000 | 9,900-10,200 |

The homogeneous mixture of normally solid polyethylene resin and free-radical generating crosslinking agent can be formed in any suitable manner. One suitable method of blending comprises dissolving the crosslinking agent in a solvent inert to the polyethylene (such as petroleum ether), mixing the solution in appropriate amounts with polyethylene resin pellets or granules and gradually heating the mixture to a temperature sufficient to evaporate the solvent but not so high as to decompose the crosslinking agent. In this method the resultant product comprises polyethylene pellets or granules having a uniformly distributed surface coating of crosslinking agent. In another method the particulate polyethylene resin and liquid or powedered crosslinking agent are dry-blended until the crosslinking agent is homogeneously distributed throughout the mass. As an example, polyethylene pellets (99.25% by weight) and liquid 2,5-dimethyl-2,5-di(tertbutylperoxy) hexane were blended into a homogeneous mass after twenty minutes at room temperature in a Patterson-Kelley twin shell blender. Resin and crosslinking agent can be very thoroughly mixed by fluxing the mixture on a two-roll mill or in a Banbury mixer at temperatures below the gel point of the admixture, if desired. This latter mode of mixing does not afford any significantly greater degree of homogeneity than that obtained by the dry-blending or solvent-blending methods previously described and thus will ordinarily be uneconomical.

In the process of this invention the crosslinking agent is used in an amount of from about 0.2 to about 4.0 percent by weight, based on the weight of the polyethylene resin. Preferred amounts of crosslinking agent are from about 0.5 to about 1.0 percent by weight, based on the weight of the polyethylene. Concentrations of crosslinking agent in the operable range have little or no detectable effect on extruder output rate when compared to polyethylene having no additive. The preferred concentration range gives the best combination of process economy and efficiency. It is also within the purview of this invention to add other known ingredients, e.g., pigments, dyes, fillers, stabilizers, etc., to the homogeneous mixture of normally solid polyethylene and crosslinking agent. In preparing shrinkable film for use in food packaging it is generally unnecessary and often undesirable (because of possible toxicity or other physiological problems) to use additives other than the free-radical generating crosslinking agent.

In the second step of the process described herein the substantially homogeneous mixture of polyethylene and crosslinking agent is shaped into a tube by extrusion at temperatures sufficient to melt the polyethylene but below about the gel point of the mixture. Preferably the tube extrusion is accomplished in any of the well-known rotating screw extruders.

The term "gel point" as used herein means those temperatures at which there is sufficient decomposition of the crosslinking agent to cause gel formation in the polyethylene. The gel point of any specific mixture depends upon numerous factors including, e.g., the particular polyethylene and crosslinking agent, the amount of crosslinking agent, and the half-life of the crosslinking agent at various shaping temperatures. Since the gel point of any specific mixture is dependent upon so many factors it is best determined by empirical methods, i.e., by extruding a small sample and observing or determining whether any gelled polyethylene particles have been formed. As previously noted, the shaping step of the instant process must be accomplished with the formation of no more than about 2% (by weight) of gel. Thus, the term "gel point" is to be construed to include temperatures up to those which produce this result. Means for minimizing or avoiding gel formation during the shaping step include adjusting the temperature of the extruder barrel and die, adjusting the extruder output rate, varying the amount of crosslinking agent or changing the particular crosslinking agent used. Preferably, extrusion is accomplished with minimum back pressure by eliminating screen packs and the breaker plate and by using streamlined dies. When operating the extruder in this manner, there is little chance of any holdup in the high temperature zones or in the tubular die of the extruder which might cause premature crosslinking.

The tube comprising polyethylene with crosslinking agent substantially uniformly distributed therein is usually fed to the high-temperature curing zone by pulling upwards through the curing zone or gravity feeding in a substantially vertical downward direction. Feeding horizontally or in directions other than substantially vertical can be accomplished by the use of specialized equipment which will not physically mar or otherwise damage the hot extruded tube and which at the same time provides means for preventing the tube from collapsing upon itself. Because of the inherent simplicity in gravity "threading" it is preferred to extrude the tube downwards through the heated zone. In downward extrusion some necking of the tube may occur at or just below the extruder die tube before the tube is self supporting. However, this minor drawback can be overcome by initiating curing of the tube as soon as possible after it leaves the extruder.

Curing of the extruded tube is accomplished by passing it through a heated curing zone; or a series of contiguous heated curing zones maintained at different temperatures. One very satisfactory heated zone is a tubular furnace brought to curing temperatures by means of electric resistance heaters. Other suitable heating apparatus will be apparent to persons skilled in the art. In any case, it is highly desirable and thus usually preferred to perform the curing step in an inert atmosphere in order to minimize oxidative degradation of the polyethylene and/or retardation of the crosslinking reaction. One method of providing an inert atmosphere is to continually flush the heated curing zone with an inert gas (such as nitrogen, helium, argon or the like) which contains minimum amounts (preferably less than 50 parts per million) of oxygen impurity. The use of carbon dioxide as the inert flushing gas has been found to give especially interesting results in that it induces formation of carbonyl groupings in the end product film thus increasing the printability thereof. One disadvantage of the use of carbon dioxide is that it inhibits to a slight degree the crosslinking action (as evidenced by lower gel content of the cured tube). This drawback is, however, alleviated by using higher concentrations of crosslinking agent than are used, for example, when the inert flushing gas is nitrogen.

At least a portion of the heated curing zone through which the extruded tube is passed (in order to crosslink the polyethylene) is maintained at temperatures above that required to heat the polyethylene tubing to the decomposition temperature of the crosslinking agent. As used herein the term "decomposition temperature" means a temperature at which the crosslinking agent has a half life of less than about 1.0 minute, and preferably less than about 0.5 minute. There is no practical means for determining the exact temperature of the polyethylene tube without damaging the same. Hence, the exact temperature to which the heated curing zone must be raised is determined by empirical methods. Sufficient guides for determining such temperatures are furnished by the specific examples herein, and further adjustment to obtain optimum conditions will be immediately apparent to those skilled in the art after a cursory study thereof.

The polyethylene tubing is passed through the heated curing zone at a rate which provides a residence time (at the decomposition temperatures) at least equal to three (3) half-lives of the curing agent, i.e., residence time is sufficient to decompose about 85% or more of the crosslinking agent. The term "residence time" as used herein is determined by use of the following equation:

$$\text{Residence Time} = \frac{L_1}{\frac{L_2}{T}}$$

where:

$L_1$ = length of the heated curing zone in which the tubing is above the decomposition temperature and $L_2/T$ = the rate (in length per unit of time) at which polyethylene tube is withdrawn from the zone; and where $L_1$ and $L_2$ are expressed in the same units (e.g., meters, feet, inches, etc.). Required residence times are easily obtained by varying either the length $L_1$, or the rate at which the polyethylene tube is withdrawn from the heated zone, or both.

Curing of the polyethylene tube should be as rapid as possible so that the tube quickly becomes self-supporting (that is, so that it will not distort) after it leaves the extruder. The amount of cure needed to give this result cannot be precisely stated. For high molecular weight polyethylenes curing to about 10% gel is sufficient. Up to 20% gel might be required in other cases. Temperatures and residence times necessary for rapidly achieving this degree of curing depend upon such variables as the temperature of the tube as it leaves the extruder die (i.e., how far below the gel point the shaped mixture is), the specific crosslinking agent or agents used, the amount of crosslinking agent(s), and so on. In order to minimize or preclude distortion of the tube it will usually be preferred to feed the tube immediately as it leaves the extruder to the curing zone, and adjusting the conditions prevailing in the initial portion of the curing zone (that portion into which the extruded tube is first introduced) to provide at least about 20% gel within about 5 to 10 seconds or less. Curing can then be completed under the same conditions or at a slower rate under more moderate conditions, as desired.

Cured polyethylene tubing produced in the manner described above has final gel levels of greater than about 20% by weight. Under optimum conditions percent gel ranges from about 50 to about 75% by weight. Percent gel as reported in the examples is determined by extraction of a sample of tubing weighing about 0.5 gram in a refluxing solution of toluene or xylene containing 0.3% by weight of 2,6-di(tert-butyl)-4-methylphenol for about 20 hours and then drying and weighing unextracted residue (gel). The weight of unextracted residue divided by the weight of the original sample is multiplied by 100 to calculate percent gel. Results of tests run on samples taken at various depths in the tube cross-section have shown that percent gel does not vary more than about 2%, indicating that crosslinking occurs in a uniform manner over the full cross-section of the tube.

Cured polyethylene tube issuing from the heated curing zone is cooled to a temperature below that at which it adheres to itself. The temperature to which the cured tube must be cooled depends upon the particular type (i.e., high or low density) of polyethylene therein, the degree to which the polyethylene has been crosslinked, and other factors. It has been found that cured tubes of low density (about .91 to .925) polyethylene should be cooled to below about 70° centigrade before coiled or otherwise mechanically or manually handled. High density polyethylenes 0.95 to 0.98 can be handled after cooling below about 100° centigrade. A particularly preferred method of cooling is by quenching in, e.g., a bath of inert liquid such as water. Quenching greatly increases the clarity of the polyethylene film end product, thus enhancing its value as a packaging material. Other cooling methods such as air cooling, passing through cooling rings, etc., may be used if desired.

The cured and cooled tubing may be recovered and stored for later use or may be expanded immediately after cooling. In either case, the tube must be reheated to a temperature at which it will expand. These reheating temperatures depend primarily upon the type of polyethylene used to make the tubing. For low density polyethylenes, the expansion temperatures are between about 80° centigrade and about 110° centigrade, preferably from about 90° centigrade and about 105° centigrade as is well known to the art. Expansion temperatures for cured high density polyethylene tubing are about 20° centigrade to about 30° centigrade higher than those for low density polyethylene tubing. As noted above, specific details of the process and apparatus used in the expansion of polyethylene tubing to form film are known in the art and hence they need not be repeated herein.

In the fully continuous process of this invention, the cured polyethylene tubing is cooled as described above (preferably by quenching), immediately fed through a second heat exchange device (e.g., an infrared heater, a heated bath of inert liquid such as water, oil, mineral oil or a furnace, oven etc.) where it is reheated to expansion temperatures and then between two pairs of pinch rolls where it is expanded by an inert gas to form tubular film.

Any of the various well-known types of polyethylene can be used in making film by the process of this invention. Such polyethylenes include the branched low-density (i.e., about .910 to about .925) material already described in Example I above as well as the medium density materials and the newer linear high density (about .950 to .980) materials made by the Ziegler process (TiCl$_4$-Al alkyl catalyst) and the Phillips process (hexavalent chromia on silica-alumina support). The linear polyethylenes have melting points in the range of 120–136° centigrade, and therefore require peroxides (or other free-radical generating crosslinking agents) that provide gel points higher than these temperatures.

Crosslinking agents do not ordinarily have a sharp decomposition point, except possibly at very high temperatures. In the usual case, the agent requires several minutes to decompose substantially quantitatively, and the rate of decomposition at a given instant is generally proportional to the amount of material. Consequently, the decomposition rate for a given material at a given temperature can generally be determined by its half life at that temperature. The half-life of any free-radical generating agent can be readily determined by one skilled in the art. In the case of peroxides, for example, the determination involved is described in Doehnert et al., Evaluation of Organic Peroxides on the basis of Half-Life Data, Ann. Tech. Management Conf., Reinforced Plastics Div., Soc. Plastics Ind., Inc. 13, sect. 1–B, 1–8 (1958); Chem. Abs. 53, 18534i (1959).

Free-radical generating crosslinking agents which can be used in the process of the instant invention include organic peroxygen compounds and azonitriles. Suitable organic peroxygen compounds are diacyl peroxides, such as benzoyl and lauroyl peroxides; dialkyl peroxides such as diethyl peroxide, di(tert-butyl)hydroperoxide, diisopropyl peroxide or the like; hydroperoxides, such as tert-butyl hydroperoxide or the like; peracids, such as acetoperacid, benzoperacid, succinic monoperacid and the like; peresters, such as ethyl perbenzoate, butyl perbenzoate and the like; and diaralkyl peroxides such as dibenzyl peroxide, dicumyl peroxide and the like. Suitable azonitriles include dimethyl-$\alpha,\alpha'$-azodiisobutyrate, azodicyclohexane carbonitrile and other like compounds. Specific examples of suitable free radical generating crosslinking compounds and their half lives are:

| Crosslinking agent: | Half-life |
|---|---|
| Di(tert-butyl)peroxide | 1 minute at 190° C. |
| Tert-butyl hydroperoxide | 1 minute at 230° C. |
| Dichlorobenzyl peroxide | 1 minute at 112° C. |
| Tert-butyl peracetate | 0.5 minute at 178° C. |
| Dicumyl peroxide | 0.6 minute at 182° C. |

| Crosslinking agent: | Half-life |
|---|---|
| Diethyl peroxide | 1 minute at 198° C. |
| Di(tert-amyl) peroxide | 1 minute at 182° C. |
| Cyclohexyl peroxide | 0.5 minute at 226° C. |
| 2,5-dimethyl-2,5-di-(tert-butyl-peroxy) hexane | 0.6 minute at 185° C. |
| 2,5-dimethyl-2,5-di-(tert-butyl-peroxy)-3-hexyne | 0.6 minute at 192° C. |
| α,α' - Azobis(α,γ,γ - trimethyl-valero-nitrile) | 2 minutes at 91° C. |
| α,α' - Azobis(α - cyclopropyl-propionitrile) | 1 minute at 118° C. |
| Dimethyl - α,α' - azodiisobuty-rate | 2 minutes at 138° C. |
| α,α'-Azodiisobutyronitrile | 2 minutes at 130° C. |
| A z o dicyclohexane carboni-trile | 2 minutes at 166° C. |
| β-Hydroxyethylazo - α,γ - dimethylvalero-nitrile | 2 minutes at 182° C. |

Especially preferred crosslinking agents used in the process of this invention are dicumyl peroxide,

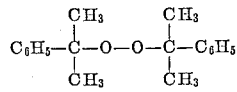

2,5-dimethyl-2,5-di-(tert-butylperoxy) hexane (formula shown in Example 1 above) and 2,5-dimethyl-2,5-di-(tert-butylperoxy)-3-hexyne,

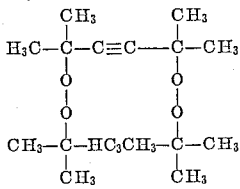

Most especially preferred for use in preparing films to be used in the food packaging industry is 2,5-dimethyl-2,5-di-(tert-butylperoxy) hexane.

The crosslinking agents can be used singly or in combination. It is only necessary that the "gel point" of the mixture be sufficiently high to enable shaping of the mixture in a tube extruder at temperatures above the melting point of the polyethylene resin base. Because of this limitation some crosslinking agents, e.g. diacyl peroxides, cannot be used alone since they decompose too fast at extrusion temperatures. However, they can be used in small proportions (e.g. ½₀ to ⅒ of the total amount of crosslinking agent) together with agents having much longer half-lives at extrusion temperatures. These small amounts will not significantly lower the gel point of the mixture and also are valuable in assisting fulfillment of the requirement of rapid curing of the shaped tube after it leaves the extruder to avoid distortion.

FIGURE 1 is a schematic illustration of an arrangement of apparatus elements suitable for performing the process of this invention in a fully continuous manner.

As shown in FIGURE 1, 20 and 21 are suitable storage hoppers for particulate (granular or pelleted) normally solid polyethylene resin and for crosslinking agent, respectively. As discussed hereinabove, the crosslinking agent can be used in its available form (powder or liquid) or as a solution in an inert solvent. Polyethylene and crosslinking agent are fed in appropriate proportions to blender 22 where they are formed into a substantially homogeneous mixture. The mixture can be stored if desired or immediately transferred to feed hopper 2 of rotating screw extruder 1. The extruder screw (not shown) is driven by power source 24 which rotates drive shaft 25 connected to the screw. The extruder is heated in known manner to a temperature sufficient to flux (melt) the polyethylene but below temperatures at which the crosslinking agent will decompose. The fluxed mass of polyethylene is pushed out of the extruder through adapter 3 to tubing die 4 which faces in a vertically downward direction. Polyethylene tube T formed by the die falls under the force of gravity through cooling ring 5 and into heated zones 6A, 6B, and 6C situated immediately below the cooling ring. The cooling ring prevents heat transfer from top heated zone 6A to the die 4. Such heat transfer can result in undesirable premature crosslinking of the tube in the die.

For better understanding heated zones 6A, 6B and 6C are shown in partial cross section. Each zone in the preferred embodiment consists of a cylindrical heavy-duty furnace heated by electrical resistance wires (not shown). The furnaces can be wired so as to have individually controlled heated zones or each furnace can be controlled as a unit. Inert gas such as nitrogen is fed through lines 28, 29 and 30 through valves 26 and 27, respectively, and thence to sparging rings 31 and 32, respectively, suitably located at the top and bottom of the contiguously connected furnaces. Other means of maintaining an inert atmosphere in the interior of the furnaces will be readily apparent.

The polyethylene tubing T is cured as it passes through the furnaces 6A, 6B and 6C to a percent gel greater than about 20% and preferably greater than about 50% by appropriate adjustments of temperature and residence time in the furnace, as previously described.

As it leaves the furnace the cured tubing is cooled to a temperature below that at which it adheres to itself. Cooling can be in any desired manner. In the preferred embodiment shown in FIGURE 1 the cured tube is passed into a quench tank 7 containing a suitable inert liquid 8 (such as water) which is maintained at temperatures below about 70° centigrade for low-density polyethylene tubing or below about 110° centigrade for high density polyethylene tubing. After quenching the tube is passed under roll 11 which may be a driven roll if desired, and thence to counterrotating pinch rolls 12a and 12b. At this point of the process, the tube can be coiled up as a tape and stored or shipped as such if desired or preferred.

In the preferred embodiment of this invention, the tube is passed between rolls 12a and 12b to another pair of counterrotating rolls 13a and 13b which are located in tank 9. An inert liquid 10 in tank 9 is used to reheat the tube to a temperature at which it can be expanded, e.g., between about 85 and about 110° centigrade for cured tubing composed of low density polyethylene. Inert liquid 10 must necessarily have a boiling point greater than about 110° to 135° centigrade when the cured tubing is composed of medium or high density polyethylene. In such case, it is generally preferred to place a furnace, an oven, or an infra-red heater between paired rolls 13a–13b and 14a–14b in lieu of tank 9 and liquid bath 10. The remainder of the apparatus illustrated, comprising rolls 14a and 14b; bubble 19 filled with inert gas 16; rolls 15a and 15b; roll 17 and takeup device 18 is similar to that used in production of other oriented films (see, e.g., Kirk-Othmer, Encyclopedia of Chemical Technology, vol. 14, page 751) and need not be further described herein.

In the following examples apparatus such as that described immediately above was used to continuously produce crosslinked polyethylene tubing under various conditions.

EXAMPLES 2–24

In these examples the polyethylene used was commercially available low density (0.92) resin in pelleted form. The cross-linking agent was 2,5-dimethyl-2,5-di(tert-butylperoxy) hexane. The polyethylene pellets were blended with 0.75% by weight (based on weight of the polyethylene) of the liquid peroxide for twenty minutes at room temperature in a Patterson-Kelley twin shell blender to form a substantially homogeneous mixture.

The mixture was fed into a one-inch rotating screw extruder having a length to diameter ratio of 20 to 1 and a compression ratio of 4 to 1. No breaker plate or screen pack was used. The polyethylene was extruded through an adapter and out of a ¼-inch by 0.040-inch tubing die in a vertically downward direction from a platform 10 feet high upon which the extruder assembly was mounted. The three sections of the extruder barrel were maintained at 220°, 240° and 260° Fahrenheit, respectively, with lowest temperatures at the feed end. Measured die temperatures were within the range of from 260° to 310° Fahrenheit.

Directly below the die (about 2 inches) was a heated curing zone consisting of three Hevi-Duty resistance heated furnaces. Furnace 1 (corresponding to zone 6A in FIGURE 1) was a 3000 watt furnace 26½ inches long with a 3⅛-inch diameter heating chamber. There were three controlled heating zones in this furnace 3½ inches, 12 inches and 8½ inches long, respectively. By turning the furnace over, the top zone (closest to the die) could be either 3½ or 8½ inches. In these examples an individually controlled 8½-inch top zone in Furnace 1 was used. Furnace 2 (corresponding to zone 6B in FIGURE 1) was a 1900 watt furnace, 25 inches long with a 3½-inch diameter heating chamber and a temperature control positioned at its center. Furnace 3 (corresponding to zone 6C) had a 2⁷⁄₁₆-inch diameter chamber. Furnace 3 was used as an annealing chamber in this example so that no heating power was supplied thereto. Sparging rings for introducing nitrogen into the furnace chambers were provided at the top of furnace 1 and bottom of furnace 3. A small needle-like pipe in the die was used to place a small amount of inert gas such as nitrogen inside the tube issuing from the extruder so as to prevent the tube from collapsing upon itself before it was cured. Another similar pipe adjacent to the first served as a vent for gaseous products formed by decomposition of the crosslinking agent as the curing step proceeds. Means for monitoring the amount of inert gas and regulating the venting of decomposition products so as to avoid expansion of the tube before it is cured will be readily apparent to those skilled in the art. To avoid over-heating of the die a 1⅜-inch thick cooling ring was positioned between the die and the top of furnace 1.

A series of runs was made in the apparatus described. Significant data is shown in the table below. In each case the tubing was fed to a water filled quench tank maintained at temperatures below about 70° centigrade. The furnace temperatures shown in the table are those measured in the top zone of furnace 1, at the middle of furnace 1 and at the middle of furnace 2. As noted above, furnace 3 was used as an annealing chamber and thus was not heated.

Some of the runs shown in Table I lasted for more than about 15 hours. Reproducible results were obtained in each instance. The percent gel throughout the cross section of tubing produced did not vary more than 2%, showing the crosslinking was uniform. The cured tubing was readily fabricated into tubular film by feeding through a hot water bath to reheat it to about 95 to 100° centigrade and expanding by the trapped bubble technique. The film produced was satisfactory for use in shrink packaging of various food.

*Table I.—Continuous production of cured polyethylene tubing*

| Run No. | Extruder Screw Speed (r.p.m.) | Extruder Output (grams per minute) | Heating Curing Zone Temperatures, Degrees Fahrenheit | | | Production Rate, Feet of Cured Tubing per minute | Tube Measurement | | |
|---|---|---|---|---|---|---|---|---|---|
| | | | Top Zone Furnace 1 | Middle Furnace 1 | Middle Furnace 2 | | Wall Thickness (inch) | Lay Flat Width (inch) | Percent Gel (In Boiling Toluene) |
| 2 | 30 | 30.0 | 850 | 550 | 500 | 21'2" | .018 | 1/4 | 55.5/53.6 |
| 3 | 40 | 41.9 | 850 | 550 | 500 | 26'6" | .019 | 3/16 | 49.8/45.2 |
| 4 | 30 | 31.0 | 950 | 550 | 500 | 18'11" | .018 | 1/4 | 54.4/56.7 |
| 5 | 40 | 42.2 | 950 | 550 | 500 | 24'7" | .022 | 1/4 | 59.0/59.5 |
| 6 | 30 | 30.0 | 1,050 | 550 | 500 | 16'7" | .021 | 1/4 | 61.2/54.4 |
| 7 | 40 | 42.5 | 1,050 | 550 | 500 | 21'1" | .020 | 1/4 | 55.6/54.8 |
| 8 | 30 | 32.0 | 1,150 | 550 | 500 | 15'8" | .020 | 1/4 | 50.8/48.5 |
| 9 | 40 | 42.5 | 1,150 | 550 | 500 | 19'5" | .022 | 1/4 | 51.5/54.6 |
| 10 | 30 | 29.5 | 850 | 550 | 550 | 18'11" | .018 | 1/4 | 56.5/56.7 |
| 11 | 40 | 42.0 | 950 | 550 | 550 | 22'2" | .018 | 1/4 | 56.9/57.7 |
| 12 | 30 | 31.0 | 1,050 | 550 | 550 | 15'4" | .019 | 5/16 | 51.7/53.4 |
| 13 | 40 | 40.8 | 1,050 | 550 | 550 | 19'1" | .020 | 5/16 | 57.6/56.7 |
| 14 | 40 | 41.5 | 1,150 | 550 | 550 | 16'11" | .022 | 5/16 | 53.1/52.5 |
| 15 | 30 | 30.0 | 900 | 550 | 500 | 17'2" | .016 | 5/16 | 53.4/54.1 |
| 16 | 40 | 42.0 | 900 | 550 | 500 | 22'1" | .118 | 1/4 | 60.0/56.8 |
| 17 | 30 | 31.0 | 925 | 550 | 500 | 16'9" | .016 | 5/16 | 53.5/53.1 |
| 18 | 40 | 41.5 | 925 | 550 | 500 | 22'3" | .020 | 1/4 | 56.6/58.9 |
| 19 | 30 | 30.8 | 950 | 550 | 500 | 16'9" | .021 | 1/4 | 56.6/58.8 |
| 20 | 40 | 41.8 | 950 | 550 | 500 | 21'1" | .018 | 1/4 | 59.8/58.5 |
| 21 | 30 | 30.0 | 975 | 550 | 500 | 16'8" | .018 | 1/4 | 56.6/57.8 |
| 22 | 40 | 42.0 | 975 | 550 | 500 | 20'9" | .020 | 5/16 | 57.9/57.3 |
| 23 | 30 | 29.5 | 1,000 | 550 | 500 | 15'7" | .018 | 1/4 | 53.5/55.3 |
| 24 | 40 | 41.0 | 1,000 | 550 | 500 | 20'1" | .021 | 1/4 | 56.1/56.6 |

EXAMPLES 25–26

In these examples the polyethylene used was a high (.950) density resin having a melt index of 5.0 and in flake-like form. A solution containing 30 grams of 2,5-dimethyl-2,5-di(tert-butylperoxy)-3-hexyne per 200 cubic centimeters of petroleum either was prepared. The resin and peroxide solution were blended in a twin-shell blender in proportions to provide 0.75 percent by weight peroxide based on the weight of the polyethylene.

Portions of the above blend were fed through the extruder used in Examples 2–24 above and out of a ¼ inch by 0.037 inch tubing die. Again no screens or beaker plates were used. The three sections of the extruder barrel were maintained at 260°, 280° and 300° Fahrenheit respectively, with lowest temperatures at the feed end. Temperature measured at the die was 320° Fahrenheit. The extruder screw was rotated at 40 revolutions per minute.

The shaped tube was fed vertically downward through a heated curing zone essentially the same as that described in Examples 2–24 above, using an 8½ inch top zone in furnace 1. The cured tubing produced was quenched in a 45° Fahrenheit water bath.

Data for these examples is shown in Table I. Furnace temperatures shown are those measured at the top of furnace 1, at the bottom of furnace 1, and at about the middle of furnace 2. Furnace 3 was used as an annealing chamber.

*Table II.—Continuous production of cured polyethylene tubing*

| Run No. | Extruder Screw Speed (r.p.m.) | Extruder Output (grams per minute) | Heating Curing Zone Temperatures, Degrees Fahrenheit | | | Production Rate, Feet of Cured Tubing per minute | Tube Measurement | | |
|---|---|---|---|---|---|---|---|---|---|
| | | | Top Zone Furnace 1 | Middle Furnace 1 | Middle Furnace 2 | | Wall Thickness (inch) | Lay Flat Width (inch) | Percent Gel (In Boiling Xylene) |
| 25 | 40 | 34.0 | 870 | 505 | 380 | 21'3" | .020 | ¼ | 53.2 |
| 26 | 40 | 34.0 | 965 | 500 | 385 | 21'2" | .020 | ¼ | 56.3 |

The cured high-density polyethylene tubing produced in these examples has excellent solvent resistance. Furthermore, because of its excellent resistance to distortion or bursting at high temperature and pressure, it is ideally suited for use as a hot water conduit.

The cured high density polyethylene tubing was expanded to form film after it was reheated to temperatures of from about 120° to about 135° centigrade. The film so produced has very good clarity and sparkle. These properties have not been previously achieved in films produced by irradiation crosslinking of high density polyethylene.

Insofar as is known, no one has heretofore been able to produce unfilled chemically crosslinked polyethylene tubing at the commercial speeds shown in the Examples 2–26 (above) without some means for supporting the tube between the shaping and curing steps.

Thus it is seen that this invention provides a process and apparatus for the continuous production of unfilled, unsupported chemically crosslinked polyethylene tubing and also for the continuous production of shrinkable crosslinked polyethylene film having properties which make it a very desirable material for use in various packaging industries, particularly in the food packaging industry.

What is claimed is:

1. Process for continuous production of shrinkable polyethylene film which comprises forming a substantially homogeneous mixture of a normally solid polyethylene and from about 0.2 to about 4.0 percent by weight, based on the weight of the polyethylene, of a crosslinking agent; shaping said mixture into a tube by extruding the same at temperatures between the melting point of the polyethylene and the gel point of the mixture; feeding the extruded tube into a heated curing zone maintained at temperatures sufficient to heat the mixture above the decomposition temperature of the crosslinking agent; passing said tube through said curing zone at a rate sufficient to provide a residence time in said zone at least equal to about three half-lives of said crosslinking agent; cooling the thus cured tubing to a temperature below that at which it adheres to itself; reheating the cured, cooled tubing to temperatures at which it can be expanded and expanding said reheated tube to form tubular film therefrom.

2. Process as defined in claim 1 wherein said crosslinking agent is an organic peroxygen compound.

3. Process as defined in claim 2 wherein said crosslinking agent is used in an amount between about 0.5 percent and about 1.0 percent by weight.

4. Process as defined in claim 2 wherein said crosslinking agent is dicumyl peroxide.

5. Process as defined in claim 2 wherein said crosslinking agent is 2,5-dimethyl-2,5-di-(tert-butylperoxy)hexane.

6. Process as defined in claim 2 wherein said crosslinking agent is 2,5-dimethyl-2,5-di-(tert-butylperoxy)-3-hexyne.

7. Process as defined in claim 1 wherein said tube is extruded in a substantially vertically downward direction and is gravity fed to said curing zone.

8. Process as defined in claim 7 wherein an inert gas atmosphere is maintained in said heated curing zone.

9. Process as defined in claim 8 wherein said inert gas is a member of the group consisting of nitrogen and carbon dioxide.

10. Process for the continuous production of shrinkable polyethylene film which comprises forming a substantially homogeneous mixture of a normally solid polyethylene resin having a density of from about 0.910 to about 0.925 with from about 0.5 to about 1.0 percent by weight of 2,5-dimethyl-2,5-di-(tert-butylperoxy)-hexane, shaping said mixture into a tube by continuously extruding the same at temperatures between about 240° Fahrenheit and about 310° Fahrenheit and in a substantially vertically downward direction; immediately gravity feeding said extruded tube into a heated curing zone maintained at temperatures sufficient to heat the shaped mixture to a temperature at which 2,5-dimethyl-2,5-di-(tert-butylperoxy)-hexane has a half life of less than about 0.5 minute; continuously passing said tube through said curing zone at a rate sufficient to provide a residence time at said last-named temperature at least equal to three half-lives of said 2,5-dimethyl-2,5-di-(tert-butylperoxy)-hexane, whereby said tube is cured; continuously feeding said cured tube to a cooling zone where it is quenched to temperatures below about 70° centigrade; reheating said cured, quenched tube to temperatures in the range of from about 80° to about 110° centigrade; expanding said reheated tube to form tubular shrinkable film therefrom; and recovering said film.

11. Process for the continuous production of shrinkable polyethylene film which comprises forming a substantially homogeneous mixture of a normally solid polyethylene resin having a density of from about .950 to about .980 with from about 0.5 to about 1.0 percent by weight of 2,5-dimethyl-2,5-di-(tert-butylperoxy)-3-hexyne, shaping said mixture into a tube by continuously extruding the same at temperature between about 260° Fahrenheit and about 330° Fahrenheit and in a substantially vertically downward direction; immediately gravity feeding said extruded tube into a heated curing zone maintained at temperatures sufficient to heat the shaped mixture to a temperature at which 2,5-dimethyl-2,5-di-(tert-butylperoxy)-3-hexyne has a half life of less than about 0.5 minute; continuously passing said tube though said curing zone at a rate sufficient to provide a residence time at said last-named temperature at least equal to three half-lives of said 2,5-dimethyl-2,5-di-(tert-butylperoxy)-3-hexyne, whereby said tube is cured; continuously feeding said cured tube to a cooling zone where it is quenched to temperatures below about 100° centigrade, reheating said cured, quenched tube to temperatures in the range of from about 100° to about 140° centigrade; expanding said reheated tube to form tubular shrinkable film therefrom; and recovering said film.

12. Process for continuous production of unfilled, unsupported chemically crosslinked polyethylene tubing which comprises forming a substantially homogeneous mixture of a normally solid polyethylene and from about 0.2 to about 4.0 percent by weight, based on the weight of the polyethylene, of a crosslinking agent; shaping said mixture into a tube by extruding the same at temperatures between the melting point of the polyethylene and the gel point of the mixture; feeding the extruded tube into a heated curing zone maintained at temperatures sufficient to heat the mixture above the decomposition temperature of the crosslinking agent; passing said tube through said curing zone at a rate sufficient to provide a residence time in said zone at least equal to about three half-lives of said crosslinking agent; and cooling the thus cured tubing to a temperature below that at which it adheres to itself.

13. Process as defined in claim 12 wherein said crosslinking agent is an organic peroxygen compound.

14. Process as defined in claim 13 wherein said crosslinking agent is used in an amount between about 0.5 percent and about 1.0 percent by weight.

15. Process as defined in claim 13 wherein said crosslinking agent is dicumyl peroxide.

16. Process as defined in claim 13 wherein said crosslinking agent is 2,5-dimethyl-2,5-di-(tert-butylperoxy) hexane.

17. Process as defined in claim 13 wherein said crosslinking agent is 2,5-dimethyl-2,5-di-(tert-butylperoxy)-3-hexyne.

18. Process as defined in claim 12 wherein said tube is extruded in a substantially vertically downward direction and is gravity fed to said curing zone.

19. Process as defined in claim 18 wherein an inert gas atmosphere is maintained in said heated curing zone.

20. Process for continuous production of unfilled, unsupported chemically crosslinked polyethylene tubing which comprises forming a substantially homogeneous mixture of a normally solid polyethylene resin having a density of from about 0.910 to about 0.925 with from about 0.5 to about 1.0 percent by weight of 2,5-dimethyl-2,5-di-(tert-butylperoxy)-hexane, shaping said mixture into a tube by continuously extruding the same at temperatures between about 240° Fahrenheit and about 310° Fahrenheit and in a substantially vertically downward direction; immediately gravity feeding said extruded tube into a heated curing zone maintained at temperatures sufficient to heat the shaped mixture to a temperature at which 2,5-dimethyl-2,5-di-(tert-butylperoxy)-hexane has a half-life of less than about 0.5 minutes; continuously passing said tube through said curing zone at a rate sufficient to provide a residence time at said last-named temperature at least equal to three half-lives of said 2,5-dimethyl-2,5-di-(tert-butylperoxy)-hexane, whereby said tube is cured; and continuously feeding said cured tube to a cooling zone where it is quenched to temperatures below about 70° centigrade.

21. Process for continuous production of unfilled, unsupported chemically crosslinked polyethylene tubing which comprises forming a substantially homogeneous mixture of a normally solid polyethylene resin having a density of from about .950 to about .980 with from about 0.5 to about 1.0 percent by weight of 2,5-dimethyl-2,5-di-(tert-butylperoxy)-3-hexyne, shaping said mixture into a tube by continuously extruding the same at temperature between about 260° Fahrenheit and about 330° Fahrenheit and in a substanitally vertically downward direction; immediately gravity feeding said extruded tube into a heated curing zone maintained at temperatures sufficient to heat the shaped mixture to a temperature at which 2,5-dimethyl-2,5-di-(tert-butylperoxy)-3-hexyne has a half life of less than about 0.5 minutes; continuously passing said tube through said curing zone at a rate sufficient to provide a residence time at said last-named temperature at least equal to three half-lives of said 2,5-dimethyl-2,5-di-(tert-butylperoxy)-3-hexyne, whereby said tube is cured; and continuously feeding said cured tube to a cooling zone where it is quenched to temperatures below about 100° centigrade.

References Cited by the Examiner

UNITED STATES PATENTS

| | | | |
|---|---|---|---|
| 2,919,474 | 1/60 | Cole | 264—211 |
| 2,979,777 | 4/61 | Goldman | 18—67 |
| 3,008,186 | 11/61 | Voigt | 18—14 |
| 3,009,208 | 11/61 | Pirot | 18—67 |
| 3,022,543 | 2/62 | Baird et al. | 264—209 |
| 3,044,114 | 7/62 | Pirot | 18—14 |

ROBERT F. WHITE, *Primary Examiner.*

MICHAEL V. BRINDISI, ALEXANDER H. BRODMERKEL, *Examiners.*